No. 863,774. PATENTED AUG. 20, 1907.
E. J. BERG.
PARALLEL CONNECTED GENERATORS.
APPLICATION FILED JAN. 17, 1907.
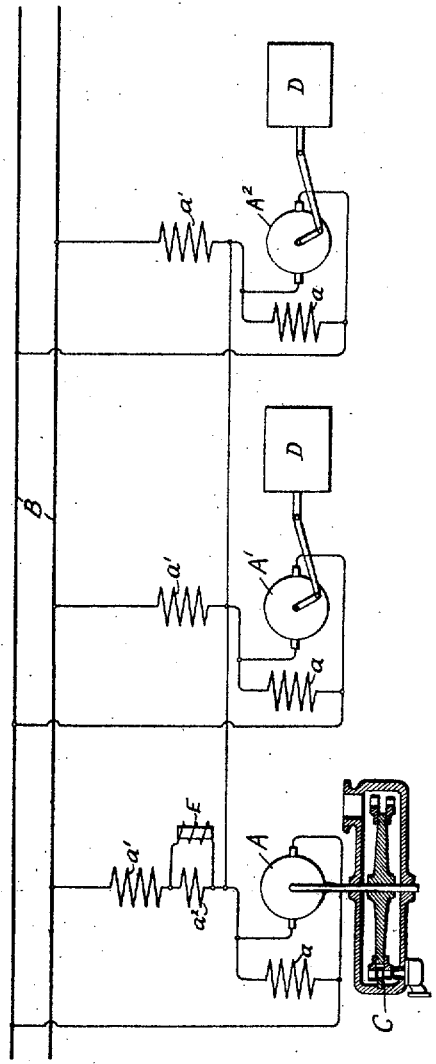
Witnesses:
Irving E. Steers.
J. Ellis Glen
Inventor
Ernst J. Berg.
by Albert G. Davis
Att'y.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

PARALLEL-CONNECTED GENERATORS.

No. 863,774.

Specification of Letters Patent.

Patented Aug. 20, 1907.

Application filed January 17, 1907. Serial No. 352,744.

*To all whom it may concern:*

Be it known that I, ERNST J. BERG, a citizen of the United States, residing at Schenectady, county of Schenectady, State of New York, have invented certain new and useful Improvements in Parallel-Connected Generators, of which the following is a specification.

My invention relates to electric generators connected in parallel, and driven by prime movers of different speed-regulation characteristics, or having different self-inductions.

When a turbine-driven generator is operated in parallel with generators driven by reciprocating engines, the turbine-driven generator ordinarily has a better speed-regulation, and because of its greater speed, is so designed that it has a smaller self-induction. The turbine driven generator may be compounded so as to divide the load equally with the other generators under ordinary load-variations; but upon the occurrence of a short-circuit or heavy overload, the turbine-driven generator takes the greater part of the load, both because of its better speed-regulation and its lower self-induction, so that it may be damaged by excessive current flow before the circuit-breaker in series with all the generators opens.

The object of my invention is to prevent the proportionate increase of load on the turbine-driven generator on a short-circuit, and I accomplish this by providing automatic means for reducing the relative strength of the field of the generator upon a sudden load.

More specifically stated, I provide a series winding for the generator opposing the main field magnetization, and shunt this winding by a reactive coil. Normally, this winding carries only a small portion of the current, but on a sudden increase of load, the self-induction of the reactive coil causes the greater part of the current to flow through the opposing field winding of the generator; thereby momentarily reducing the generator field strength so as to prevent the generator from assuming more than its share of the overload, and to give the circuit-breaker time to open.

My invention will best be understood by reference to the accompanying drawing, which shows diagrammatically three parallel-connected generators, arranged in accordance with my invention.

In the drawing $A$, $A^1$ and $A^2$ represent the armatures of three generators connected in parallel to the bus-bars $B$. Each generator has a main shunt-field $a$, and a series field $a^1$, for compounding. The generator $A$ is driven by a steam turbine $C$, while the other two generators are driven by reciprocating engines $D$. The turbine-driven generator, in addition to the usual windings, has a series winding $a^2$, which opposes the magnetization produced by the shunt-winding $a$ and the series winding $a^1$. This winding $a^2$ is shunted by a reactive coil $E$, which normally carries the greater part of the current, so that the winding $a^2$ normally has little effect; but upon a sudden increase of load, such as would occur upon a short-circuit, the self-inductance of the coil $E$ forces the greater part of the current through the winding $a^2$, which produces a weakening of the field of generator $A$, as compared with the field-strength of the other generators, so that the generator $A$ is prevented from taking the greater part of the overload, and time is given for the circuit-breaker (not shown) to disconnect the bus-bars $B$ from the line.

What I claim as new and desire to secure by Letters Patent of the United States, is:

1. In combination with a plurality of generators connected in parallel, prime movers therefor having different speed-regulation characteristics, and means for producing automatically a relative decrease in the field-strength of the generator having the best speed regulation upon a sudden increase of load on the generators.

2. In combination with a plurality of compound-wound generators connected in parallel, prime movers therefor having different speed-regulation characteristics, and means operative upon a sudden increase in load for producing a decrease in the series field-strength of the generator having the best speed-regulation relative to the series field-strengths of the other generators.

3. In combination with a plurality of generators connected in parallel, prime movers therefor having different speed-regulation characteristics, a series field winding opposing the main field magnetization in the generator having the best speed-regulation, and a reactive coil shunting said winding.

4. In combination with a plurality of generators connected in parallel, prime movers therefor having different speed-regulation characteristics, a series field winding for the generator with the best speed-regulation having two opposing portions, the stronger portion assisting the main field magnetization, and means for increasing the proportionate strength of the weaker portion upon a sudden increase of load.

5. In combination with a plurality of generators connected in parallel, prime movers therefor having different speed-regulation characteristics, a series field winding for the generator with the best speed-regulation having two opposing portions, the stronger portion assisting the main field magnetization, and a reactive coil shunting the weaker portion.

6. In combination, a plurality of generators of different self-inductions connected in parallel, and means for producing automatically a relative decrease in the field-strength of the generator having the least self-induction upon a sudden increase of load.

7. In combination, a plurality of compound-wound generators of different self-inductions connected in parallel, and means operative upon a sudden increase of load for producing a relative decrease of field-strength in the generator having the least self-induction.

8. In combination, a plurality of generators of different self-inductions connected in parallel, the generator of least self-induction having a series field winding opposing the main field magnetization, and a reactive coil shunting said winding.

9. A direct-current generator comprising a series field winding opposing the main field magnetization, and a reactive coil shunting said field.

10. A direct-current generator comprising a series field winding having two opposing portions, the stronger portion assisting the main field magnetization, and a reactive coil shunting the weaker portion.

In witness whereof, I have hereunto set my hand this 15th day of January, 1907.

ERNST J. BERG.

Witnesses:
BENJAMIN B. HULL,
HELEN ORFORD.